J. A. COOPER.
READY FORMED CONCRETE STEP.
APPLICATION FILED JAN. 14, 1920.

1,360,890. Patented Nov. 30, 1920.

Inventor
John A. Cooper

By C. W. Harpman
Attorney

UNITED STATES PATENT OFFICE.

JOHN A. COOPER, OF YOUNGSTOWN, OHIO.

READY-FORMED CONCRETE STEP.

1,360,890.  Specification of Letters Patent.  Patented Nov. 30, 1920.

Application filed January 14, 1920. Serial No. 351,312.

*To all whom it may concern:*

Be it known that I, JOHN A. COOPER, citizen of the United States of America, residing at Youngstown, in the county of Mahoning and State of Ohio, have invented certain new and useful Improvements in Ready-Formed Concrete Steps, of which the following is a specification.

This invention has for its object to provide simple and efficient ready formed reinforced concrete steps. The principal object is to provide means for assembling the ready formed steps, so that they are held securely in place.

Another object of the invention is to provide means for allowing for a slight give to the tread of the steps when the surface upon which the treads rest may become out of place, thereby causing the tread to rest upon a portion in place of the entire supporting surface. This slight give to the tread is produced by means of a spring bar which forms a dual function of holding the steps and risers together, and, at the same time, allowing for a slight give in the treads, thereby eliminating the danger of breaking or cracking the same.

Another object of the invention is to provide a wedged shape fastener of the tread.

The invention also has for its object to provide a novel construction and arrangement of parts, which can be easily and quickly assembled.

In order that the invention may be better understood, reference is had to the accompanying drawing in which.

Figure 1:
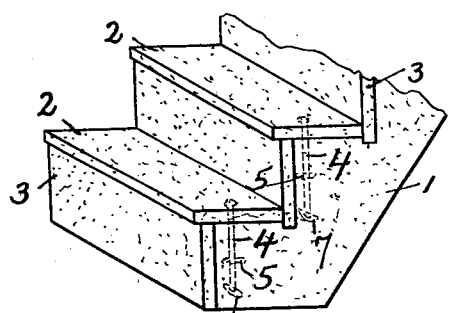
Figure 1 is a perspective view of the step when used as a stair step.

By referring to Fig. 1 it will be seen that I have provided a skirting member 1, formed of reinforced concrete, or any other suitable plastic material. Positioned upon this skirting member 1 are treads 2, and risers 3. The treads 2 are held in position by means of a spring bar 4, which passes through an opening in the tread 2, and through a loop member 5, formed so as to extend inwardly from the side member 6, this side member 6 having a notch 7 formed below the loop 5.

Figures 3, 5:
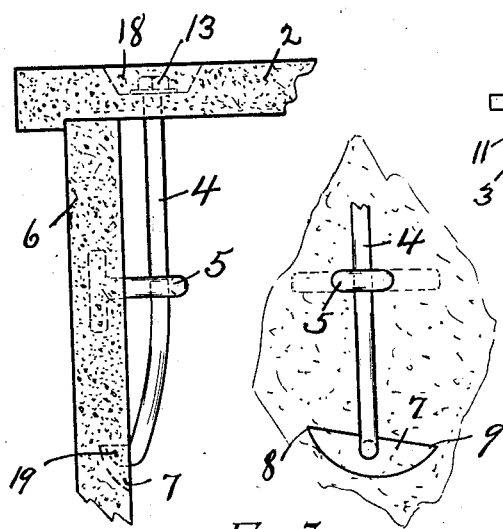
Fig. 3 is a detailed view.
Fig. 5 is a detailed view showing the spring bar in position holding the parts of the steps in position by means of the spring bar being hooked into a notch of the side member.

By referring to Fig. 3 it will be seen that the upper edge of the notch 7 has the point 8 closer to the tread 2 than the point 9 of notch 7.

Figure 4:
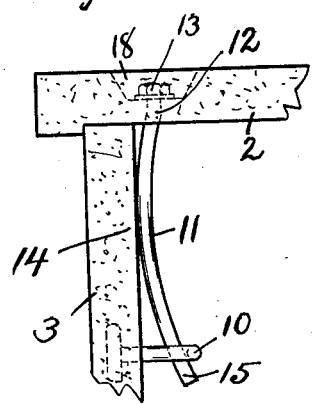
Fig. 4 is a detailed view showing the spring bar in position when used in conjunction with the beginning tread of the stairs.

By referring to Fig. 4 it will be seen that I have provided an inwardly extending loop 10, which is centrally located on the beginning riser 3 of my improved steps. In order to hold this riser 3 and tread 2 in proper position, a curved spring bar 11 is passed through the opening 12 of the tread 2, then through the loop 10. A wrench is then applied to the head 13 and the curved spring bar 11 is turned so that the central outward curve presses against the point 14 of the riser 3, and the end 15 of the curved spring bar 11 forces outwardly against the loop 10.

Figure 2:
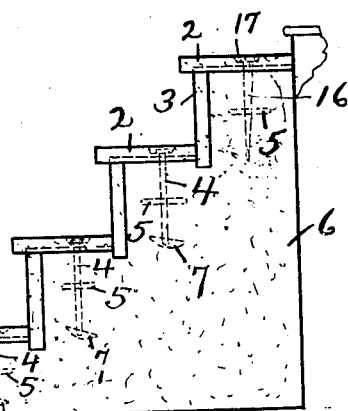
Fig. 2 is a side elevation of the device when used as an ordinary approach step.

By referring to Fig. 2 it will be seen that I have provided a wedge shaped fastener 16, which extends through an opening 17 of the tread 2, and is held in position by means of the loop 5.

By referring to Figs. 4 and 5 it will be seen that the head 13 is countersunk in the tread 2 when the curved spring bars 4 and 11 are in proper position, the recess 18 is then filled with cement, or other suitable material, thereby giving the tread 2 the appearance of a solid slab. It will also be seen that the shoulder 19 formed on the curved spring bar 4 fits securely in the notch 7, and tightens as the shoulder 19 is caused to approach the end 8 of the notch 7.

It is understood that minor changes may be made in the construction of my improved steps in so far as the same do not depart from the scope shown in the specification and drawings and pointed out in the claims.

What I claim is:

1. In a device of the class described, concrete side parts, a plurality of metal loops spaced apart extending inwardly, the securing parts of same embedded in the concrete sides, a beginning riser of a series of steps provided with an inwardly extending metal loop securing part embedded in riser, concrete treads for said riser said treads provided with openings directly above the metal side loops and the loop on the beginning tread, a steel spring bar provided with a head at the upper end and a securing shoulder at its lower end, a notch formed in the side of the side part, substantially as described for the purpose set forth.

2. In a device of the class described, a beginning riser having an inwardly extending loop formed on its inner side a tread resting thereon, a curved spring bar passing through said tread, the outer curve of said curved spring bar pressing against the inner portion of said riser, the outer end pressing against the outer edge of the outwardly extending loop, substantially as described for the purpose set forth.

3. In a device of the class described, a side portion having an inwardly extending loop, a tread resting upon said riser, a curved spring bar passing through said tread and through said loop, a notch formed in the side portion directly underneath the above above mentioned loop, one end of said notch being slightly elevated above the longitudinally supporting plane of the side portion, a shoulder formed upon the end of said curved spring bar to grip securely in the above mentioned notch, substantially as described for the purpose set forth.

4. In a device of the class described, the combination of a beginning riser, a loop secured thereon, a curved spring bar passing through a tread resting upon said riser, the outer end secured by the above mentioned loop, the central portion springing against the inner side of said riser, a wedge shaped fastener passing through a tread and an extending loop secured to side portion of steps, substantially as described for the purpose set forth.

In testimony whereof I affix my signature.

JOHN A. COOPER.

Witnesses:
 GEO. L. MEYER,
 C. A. HARPMAN.